Figure 5:
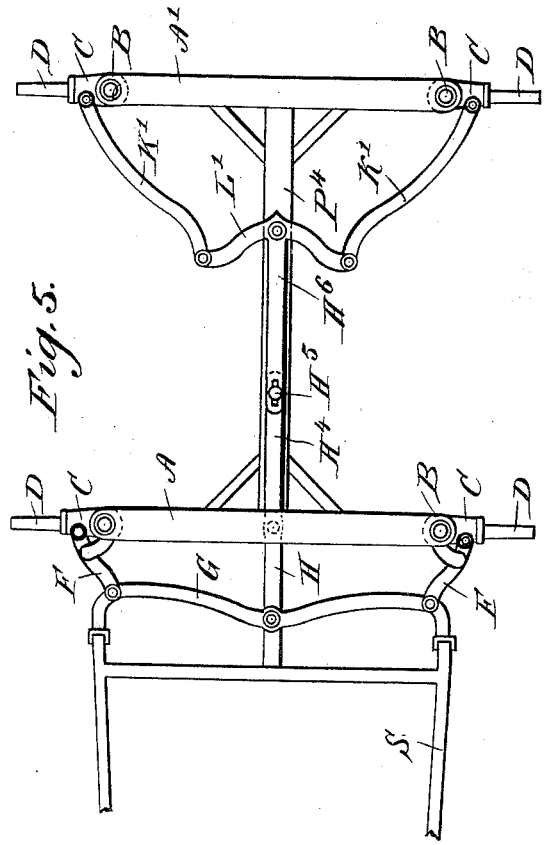

(No Model.) 4 Sheets—Sheet 1.
C. A. BLUME & F. N. ARMSTRONG.
RUNNING GEAR FOR VEHICLES.
No. 411,372. Patented Sept. 17, 1889.
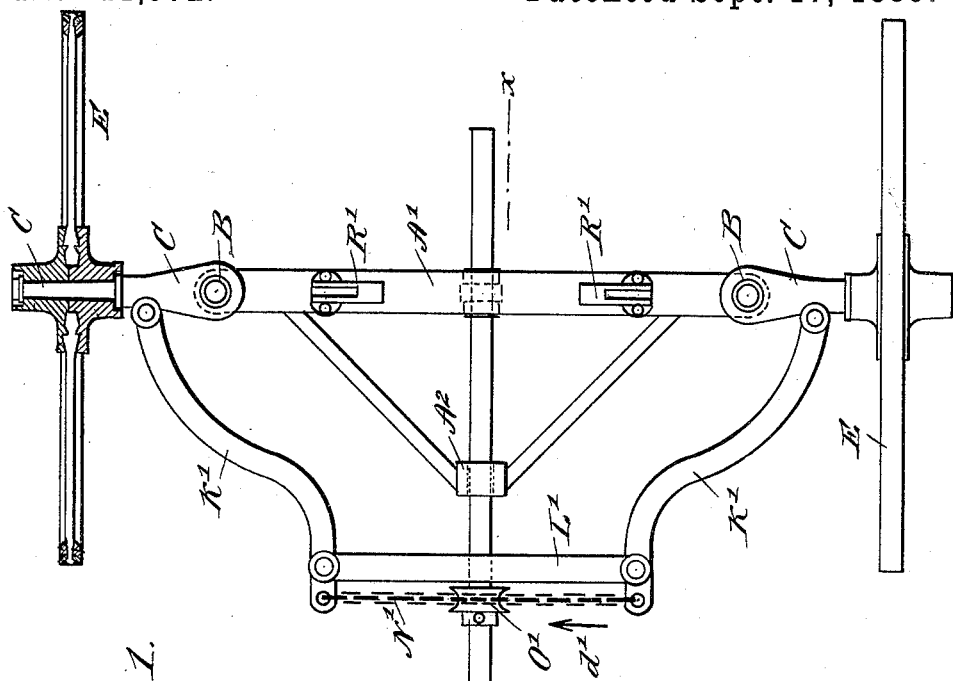
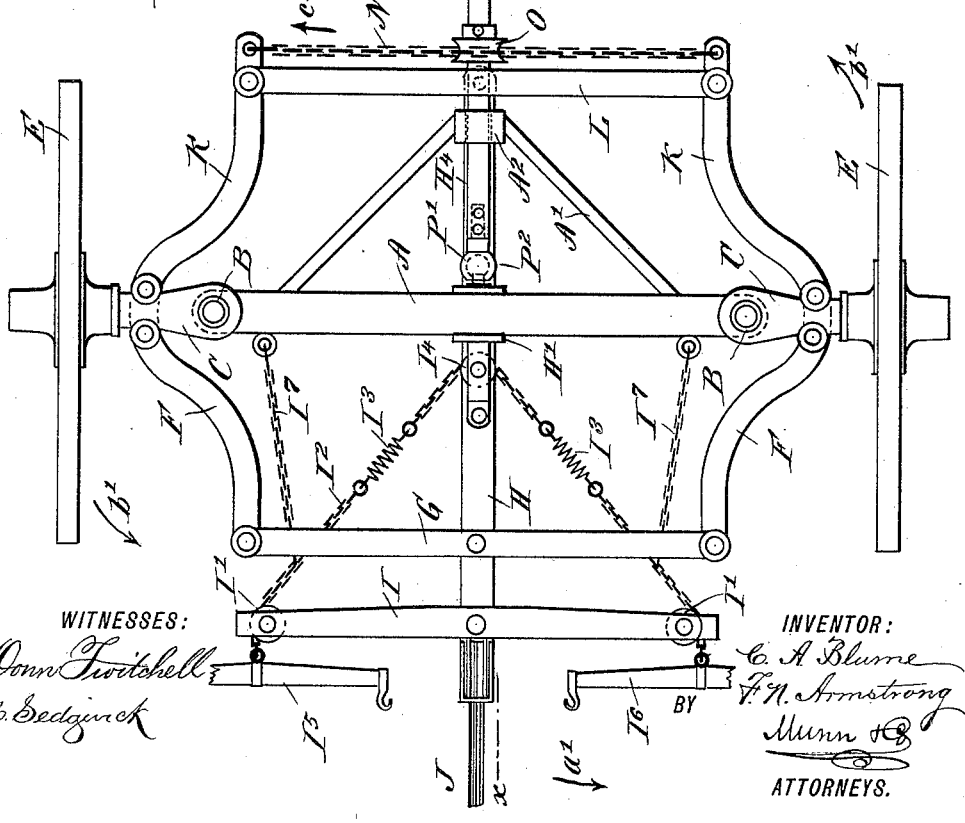
Fig. 1.
WITNESSES:
Donn Twitchell
C. Sedgwick
INVENTOR:
C. A. Blume
F. N. Armstrong
BY Munn & Co.
ATTORNEYS.
N. PETERS, Photo-Lithographer, Washington, D. C.

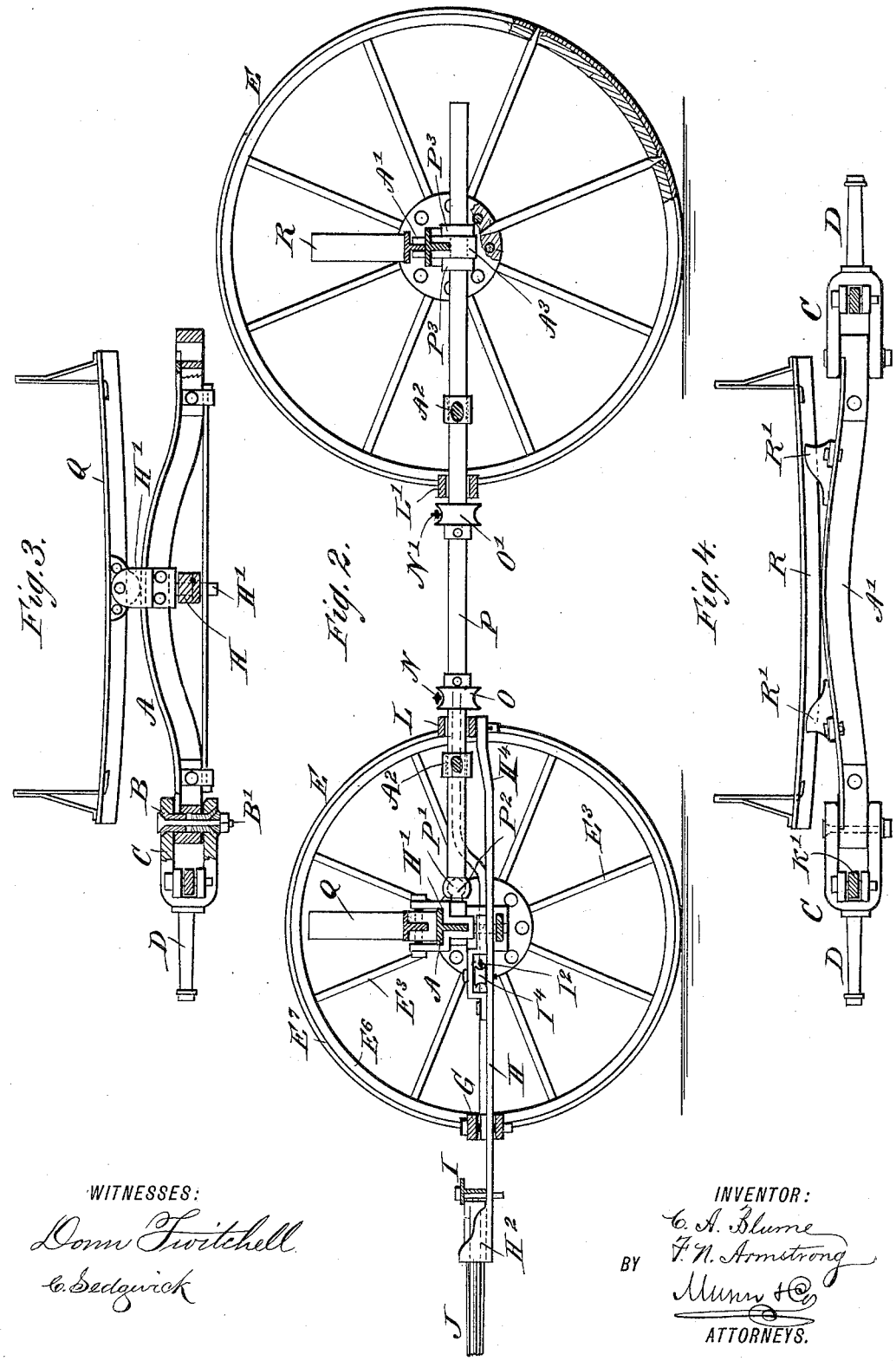

(No Model.) 4 Sheets—Sheet 3.
C. A. BLUME & F. N. ARMSTRONG.
RUNNING GEAR FOR VEHICLES.
No. 411,372. Patented Sept. 17, 1889.

WITNESSES:
Donn Twitchell
C. Sedgwick

INVENTOR:
C. A. Blume
F. N. Armstrong
BY Munn & Co.
ATTORNEYS.

(No Model.) 4 Sheets—Sheet 4.
C. A. BLUME & F. N. ARMSTRONG.
RUNNING GEAR FOR VEHICLES.
No. 411,372. Patented Sept. 17, 1889.
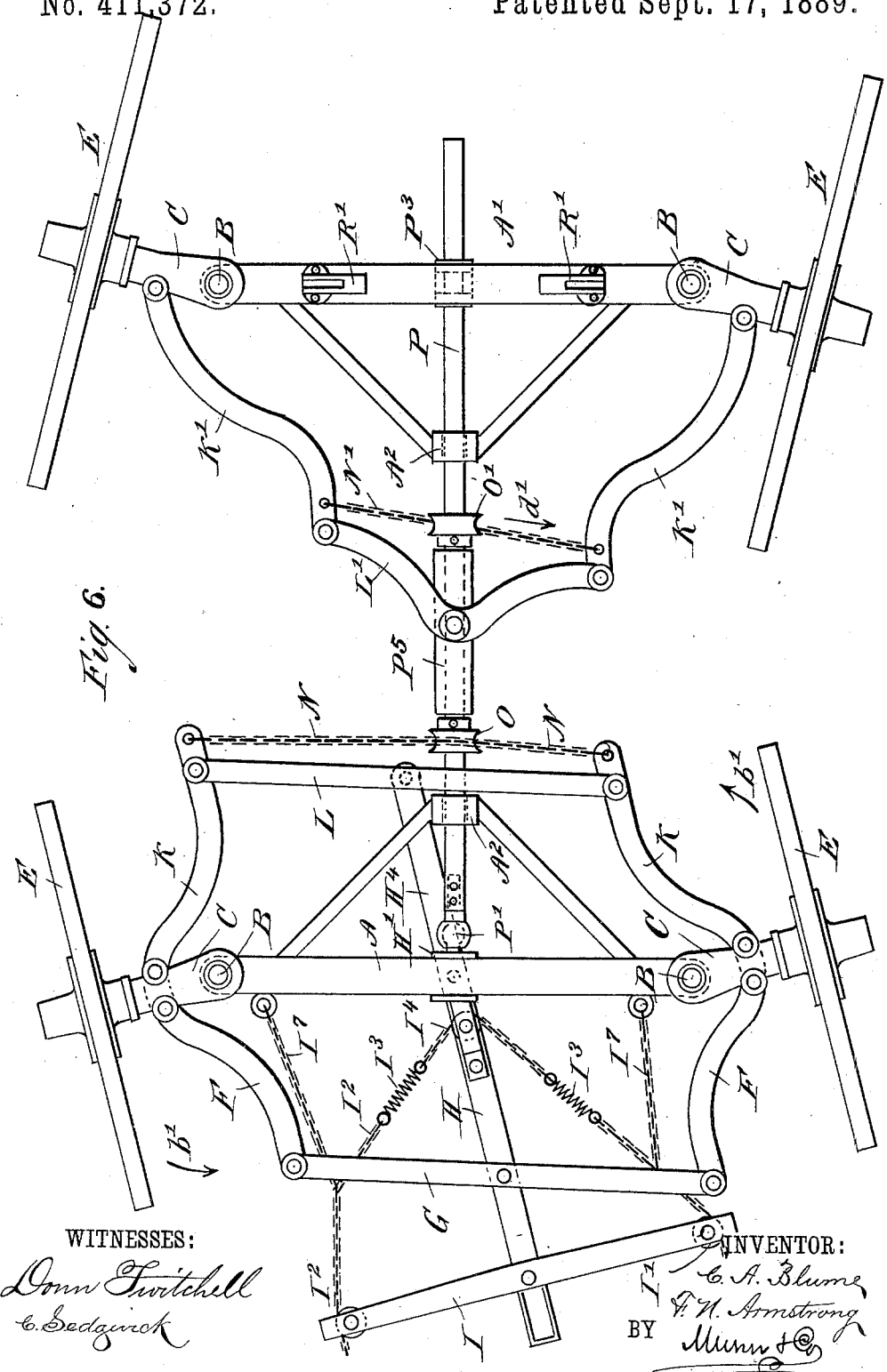
WITNESSES:
Donn Twitchell
C. Sedgwick
INVENTOR:
C. A. Blume
F. N. Armstrong
BY Munn & Co.
ATTORNEYS.

UNITED STATES PATENT OFFICE.

CHARLES A. BLUME AND FRANCIS NEWTON ARMSTRONG, OF COLFAX, INDIANA; SAID ARMSTRONG ASSIGNOR TO DAVID LANUM, OF SAME PLACE.

RUNNING-GEAR FOR VEHICLES.

SPECIFICATION forming part of Letters Patent No. 411,372, dated September 17, 1889.

Application filed November 9, 1888. Serial No. 290,360. (No model.)

*To all whom it may concern:*

Be it known that we, CHARLES A. BLUME and FRANCIS NEWTON ARMSTRONG, both of Colfax, in the county of Clinton and State of Indiana, have invented a new and Improved Running-Gear for Vehicles, of which the following is a full, clear, and exact description.

The invention relates to vehicles having their wheels mounted on pivoted axle-arms arranged to be operated by the pole or shafts in turning.

The object of the invention is to provide a new and improved running-gear for vehicles, which is very simple and durable in construction, is made in all its parts of a combination of T-steel, angle-steel, bar-steel, gas-pipe, and malleable iron, runs very easily, and permits a turning of the vehicle in a very small space and with great ease.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement with one of the wheels in section. Fig. 2 is a sectional side elevation of the same on the line $x\ x$ of Fig. 1 and with parts of one wheel broken out. Fig. 3 is a sectional side elevation of the front axle. Fig. 4 is a like view of the rear axle. Fig. 5 is a plan view of a modified form of the improvement, and Fig. 6 is a plan view of another modified form of the improvement.

The vehicle is provided with the front and rear axle-bars A and A', each of which is provided near its ends with pivots B, each made in two parts held together by a bolt B'. At the pivot B is held to turn the forked head C, carrying the axle-arm D. On each of the axle-arms D is mounted to turn a wheel E, which is shown in section in Figs. 1 and 2.

The axle-heads of the front axle-bar A are pivotally connected at their front ends by the curved links F with the ends of a bar G, fulcrumed on an arm H, pivoted at its inner end on a bracket H', secured to the middle of the axle-bar A. Near the outer end of the pivoted arm H is pivoted a doubletree I, carrying on its ends the rollers I', over which pass the ends of a chain $I^2$, extending inward and pivoted with springs $I^3$, and also passing over a roller $I^4$, held to rotate on top of the pivoted arm H near the axle-bar A, as is plainly seen in Fig. 1. On the ends of the chains $I^2$ are held the singletrees $I^5$ and $I^6$, respectively, to which the horses are attached, for propelling the vehicle forward. By connecting the singletrees $I^5$ and $I^6$ with the yielding chain $I^2$ I equalize the draft on the vehicle. Limit-chains $I^7$ connect the chain $I^2$ with the ends of the axle-bar. On the front end $H^2$ of the pivoted arm H is held the pole or shaft J, which is preferably built entirely of metal and serves to move the pivoted arm H to the right or left, according to the direction in which the vehicle is to turn.

On the inside of the axle-heads C of the axle-bar A are pivoted the curved links K, pivotally connected with each other by a bar or arm L, pivotally connected in its middle with the rear extension $H^4$ of arm H. The extreme outer ends of the said curved links K are also connected with each other by a chain N, passing over a pulley O, secured on a shaft P, which forms the reach between the axle-bars A and A'. The shaft P is mounted to turn in the bearings $A^2$, supported by suitable braces or brackets on the axle-bars A and A'. On the inner end of the shaft P is formed a spherical socket P', into which fits a ball $P^2$, secured to the bracket H' in the middle of the axle-bar A. This connection of the shaft P with the axle-bar A permits the turning of the shaft P whenever the chain N is moved from one side to the other, said chain passing over the pulley O, secured to the said shaft P. On the rear end of the shaft P are secured the collars $P^3$, resting against a bearing $A^3$, formed or secured to the under side of the rear axle-bar A'. Thus the shaft P forms the reach between the axle-bars A and A', and this reach-shaft is adapted to turn in its bearings, as hereinafter more fully described.

Directly behind the pulley O a second pulley O' is secured to the shaft P, and over the said pulley O' passes a chain N', connecting the outer ends of the links K' with each other. Said links K' are connected with each other near the chain N' by the rod or bar L', and are also pivotally connected with the axle-heads C of the rear axle-bar A. As shown in the modification, Fig. 6, the rod L' is changed into a curved lever pivoted on a sleeve P⁵, held loosely on the shaft P.

On the top of the front axle-bar A is held a bolster Q, made of T-steel, and on the rear axle-bar A' is supported a similar bolster R, resting on slotted lugs R', secured by suitable means to the top of the rear axle-bar A'.

When the team is attached to the singletrees I⁵ and I⁶ and to the pole J in the usual manner, and the teamster desires to turn the vehicle, say, to the left, he pulls the team to the left, so that the pole J is moved with the pivoted arm H in the direction of the arrow $a'$. This movement of the pivoted arm H causes the bar or lever G and the bar L to act by means of the links F and K on the axle-heads C of the axle-bar A in such a manner that the wheels E of the front axle-bar turn in the direction of the arrows $b'$, thereby changing the direction of the vehicle to the left. The swinging movement of the links K moves the chain N in the direction of the arrow $c'$, so that the chain by passing over the pulley O turns the shaft P. The turning of the shaft P causes a rotation of the pulley O', so that the chain N', passing over the said pulley O', is moved in the direction of the arrow $d'$, and the links K' are swung and impart a swinging motion to the axle-heads C of the rear axle-bar A' in the same manner as the axle-heads C of the axle-bar A, but in an opposite direction. Thus the rear wheels E turn in an opposite direction from the front wheels and at the same time, so that the rear wheels always follow in the track of the front wheels, thereby enabling a turning of the vehicle in a very small space and with great ease. When the pole J is turned in the opposite direction to the arrow $a'$, similar movements take place, only in the opposite direction to those above described.

In the modification shown in Fig. 6 the pivoted rod L' swings when the chain N' is moved, and imparts a swinging motion to the rear wheels in the manner above described.

In the modification shown in Fig. 5 the vehicle is adapted for one horse attached to the shafts S, pivotally connected with the ends of the lever G, which latter is fulcrumed in its middle on the pivoted arm H and connected by the links F with the axle-heads C, as above described. The rearward extension H⁴ of the pivoted arm H is pivotally connected by a pin H⁵ with a slotted arm H⁶, projecting from the middle of the arm L', pivotally connected by the links K' with the axle-heads C of the rear axle-bar A'. The arm L' is fulcrumed on a fixed reach P⁴, connecting the axle-bars A and A' with each other. When the shafts S are turned to the right or left, the axle-heads C on both the front and rear axle-bars A and A' are turned simultaneously in opposite directions in a manner similar to that above described in reference to Fig. 1.

It is understood that the several parts of the entire vehicle are made of a combination of T-steel, angle-steel, bar-steel, gas-pipe, and malleable-iron castings.

Having thus described our invention, we claim as new and desire to secure by Letters Patent—

1. In a running-gear for vehicles, the combination, with a front axle-bar, of axle-heads pivoted on the ends of the said axle-bar, wheels mounted to turn on the said axle-heads, links pivotally connected with the said axle-heads, a lever fulcrumed in its middle and pivotally connected at its outer end with the said links, a pole-carrying arm supporting the said lever and pivoted in the middle of the axle-bar, a doubletree held on the said pivoted arm and supporting rollers, a yielding chain passing over the said rollers and over a roller on the said pivoted arm, and singletrees held on the outer ends of the said yielding chain, substantially as shown and described.

2. In a running-gear for vehicles, the combination, with the front axle-bar and axle-heads pivoted on the same and carried by the wheels, of the rear axle-bar, a shaft mounted to rotate in bearing on the said axle-bars and turned by the swinging motion of the said front axle-heads, and rear axle-heads pivoted on the said rear axle-bar and operated from the said shaft, substantially as described.

3. In a running-gear for vehicles, the combination, with a front axle-bar provided with pivoted axle-heads, of links pivotally connected with the said heads and extending rearwardly, a bar pivotally connecting the said links, a chain secured to the said links, and a shaft mounted to turn and carry a pulley over which passes the said chain, substantially as described.

4. In a running-gear for vehicles, the combination, with a rear axle-bar and axle-heads pivoted on the same, of links pivotally connected with the said axle-heads, an arm pivotally connected with the said links, a chain fastened on the said links, a pulley passing over the said chain, and a shaft held to turn in a bearing on the said axle-bar and carrying the said pulley, substantially as described.

5. In a running-gear for vehicles, the combination, with a front axle-bar and axle-heads pivoted on the said front axle-bar, of a shaft connected at one end by a ball and socket with the said axle-bar and deriving its rotary motion from the swinging of the said axle-heads, substantially as described.

6. In a running-gear for vehicles, the combination, with a front axle-bar and axle-heads pivoted on the said front axle-bar, of a shaft connected at one end by a ball and socket with the said axle-bar and deriving its rotary motion from the swinging of the said axle-heads, a rear axle-bar supporting in suitable bearings the said shaft, and axle-heads pivoted on the said axle-bar and deriving their swinging motion from the said shaft, substantially as described.

7. In a running-gear, the combination, with the pole, the forward axle, a doubletree pivoted on the pole, and rollers held on the inner end of the pole and the ends of the doubletree, of a chain passing over said rollers, singletrees attached to the ends of the chain, springs interposed in said chain, and limit-chains connecting said first chain with the axle, substantially as shown and described.

CHARLES A. BLUME,
FRANCIS NEWTON ARMSTRONG.

Witnesses:
JOSEPH E. HAMILTON,
D. M. BALL.